United States Patent
Donde et al.

(10) Patent No.: US 9,396,504 B2
(45) Date of Patent: Jul. 19, 2016

(54) CENTRALIZED CONTROL CENTER FOR ELECTRICAL NETWORK COMPUTATIONAL SERVICES

(75) Inventors: Vaibhav Deepak Donde, Cary, NC (US); Jean-Charles Albert Tournier, Saint Genis Pouilly (FR)

(73) Assignee: ABB Research Ltd., Zurich (CH)

(*) Notice: Subject to any disclaimer, the term of this patent is extended or adjusted under 35 U.S.C. 154(b) by 753 days.

(21) Appl. No.: 13/449,997

(22) Filed: Apr. 18, 2012

(65) Prior Publication Data

US 2013/0282188 A1 Oct. 24, 2013

(51) Int. Cl.
*G06Q 50/06* (2012.01)
*H02J 3/00* (2006.01)

(52) U.S. Cl.
CPC .......... *G06Q 50/06* (2013.01); *H02J 2003/007* (2013.01); *Y02E 60/76* (2013.01); *Y04S 40/22* (2013.01)

(58) Field of Classification Search
CPC ... G05B 19/02; G06Q 50/06; H02J 2003/007; Y02E 60/76; Y04S 40/22
USPC ........................................................ 700/286
See application file for complete search history.

(56) References Cited

U.S. PATENT DOCUMENTS

| | | | | |
|---|---|---|---|---|
| 6,636,893 | B1 * | 10/2003 | Fong | 709/223 |
| 8,086,666 | B2 * | 12/2011 | Lo | G05B 19/056 700/1 |
| 2002/0087234 | A1 * | 7/2002 | Lof et al. | 700/286 |
| 2003/0014366 | A1 * | 1/2003 | Yoon | G06Q 30/06 705/50 |
| 2005/0197742 | A1 * | 9/2005 | Scott et al. | 700/286 |
| 2008/0147555 | A1 * | 6/2008 | Cromer | G06F 21/10 705/52 |
| 2009/0281673 | A1 * | 11/2009 | Taft | 700/286 |
| 2009/0281674 | A1 * | 11/2009 | Taft | 700/286 |
| 2009/0326731 | A1 * | 12/2009 | Bowdry et al. | 700/297 |
| 2010/0120359 | A1 * | 5/2010 | Agarwal | 455/12.1 |
| 2010/0152910 | A1 * | 6/2010 | Taft | 700/286 |
| 2010/0179862 | A1 * | 7/2010 | Chassin et al. | 705/10 |

(Continued)

OTHER PUBLICATIONS

Shaw, T., "Using Internet technologies for secure substation access and control," in Power Engineering Society Summer Meeting, IEEE, vol. 1, 2000, pp. 363-368.*

(Continued)

*Primary Examiner* — Carlos Ortiz Rodriguez
*Assistant Examiner* — Jennifer L Norton
(74) *Attorney, Agent, or Firm* — Cooper Legal Group, LLC (57) ABSTRACT

Among other things, one or more techniques and/or systems are provided for leasing electrical network computational services to one or more network control centers. A power grid may comprise one or more substations. Network control centers disposed within the power grid may be configured to manage the substations within the power grid. A remote centralized network control center may be configured to lease electrical network computational services to the network control centers (e.g., which may mitigate costs associated with including computational hardware and/or software within respective network control centers for performing such electrical network computational services). In this way, substation data received from a network control center may be processed by the remote centralized network control center according to a level of service subscribed to by the network control center. Computational results may be provided back to the network control center (e.g., in real-time).

20 Claims, 8 Drawing Sheets

(56) References Cited

U.S. PATENT DOCUMENTS

2011/0010016 A1* 1/2011 Giroti ............................ 700/291
2011/0282508 A1* 11/2011 Goutard et al. ............... 700/293

OTHER PUBLICATIONS

"Electrical Substation", Retrieved on Mar. 17, 2012, pp. 1-7, http://en.wikipedia.org/wiki/Electrical_substation.

"Electrical grid", Retrieved on Mar. 17, 2012, pp. 1-9, http://en.wikipedia.org/wiki/Electrical_grid.

Hickey, Andrew R., "Schneider Electric: Cloud Computing Key to Power, Energy Management", Sep. 28, 2010, CRN News, Analysis, and Perspective for VARS and Technology Integrators, pp. 1-2, http://www.crn.com/news/cloud/227500884/schneider-electric-cloud-computing-key-to-power-energy-management.htm;jsessionid=9Ajtun6qeO41x6MMunP4Nw**.ecappj01.

Moulineaux, Issy Ies, "Smart Management of Renewable Energy Sources: Alstom and Microsoft Announce Their Partnership for the Cloud Computing Initiative", Feb. 22, 2011, Alstom, pp. 1-3, http://www.alstom.com/press-centre/2011/3/01032011/.

* cited by examiner

CENTRALIZED CONTROL CENTER FOR ELECTRICAL NETWORK COMPUTATIONAL SERVICES

BACKGROUND

A power grid, such as an electrical grid, may be configured to provide electricity from suppliers to consumers. The power grid may be associated with one or more substations configured to provide electricity distribution and/or transmission functionality. For example, a substation may comprise one or more transformers configured to transform voltage from a first level to a second level (e.g., a transformer may step down voltage from a transmission level voltage to a distribution level voltage for a distribution line). A substation may be associated with and/or comprise switching equipment, protection equipment, control equipment, transformers, generators, and/or other equipment associated with the power grid.

A network control center may be configured to manage one or more substations and thereby manage electrical equipment in the substations or connected to the substations, for example. The network control center may comprise computational hardware (e.g., multi-core processors) configured to provide real-time data processing. Such computational hardware may be used by the network control center to host electrical network distribution applications, electrical network transmission applications, and/or a variety of other applications for managing substations. For example, the network control center may be configured to receive substation data from one or more substations. In one example, substation data may refer to real-time data associated with the substation, the electrical equipment therein or connected to the substation. It may be appreciated that in one example, substation data may comprise any data associated with the power grid and/or equipment associated with the power grid (e.g., current data, power data, frequency data, voltage data, phasor data, switch gear status, etc. associated with a substation and/or equipment associated with the substation, such as a generator, a transformer, switching equipment, loads, etc.). The network control center may process the substation data using one or more applications, such as a steady state analysis application and/or a transient analysis application (e.g., a state estimator application, a contingency analysis application, security analysis application, power flow analysis application, etc.). The network control center may send computational results and/or control signals back to the one or more substations.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques related to a centralized control center for electrical network computational services are provided herein. For example, one or more systems and/or techniques for leasing electrical network computational services from a remote centralized network control center to one or more network control centers are provided herein. It may be appreciated that "lease" and/or the like as used herein is not meant to be construed in a strict sense, but rather is intended to pertain more generally to any type of arrangement, agreement, contract, etc. Accordingly, the instant application, including the scope of the appended claims is not intended to be limited to strict interpretation of "lease" and/or the like. The lease may comprise, for example, details of the services provided by the remote centralized network control center to the network control centers. These details may comprise, but are not limited to, the level of service in terms of what computational services and steady state/transient state applications may be performed for a network control center, how frequently the computational services and/or applications may be performed, memory and/or execution performance requirements, the duration of the lease etc.

A power grid, such as an electrical grid, may comprise a plurality of substations. A substation may comprise various electricity distribution and/or transmission equipment (e.g., switches, transformers, generators, loads, transmission lines, distribution lines, etc.). Network control centers may be deployed within the power grid to manage substations. For example, a network control center may monitor substations, process substation data, and/or send control signals to substations. Because a significant number of network control centers may be deployed within the power grid, the instant application pertains to centralizing computational hardware and/or electrical network applications at a remote centralized network control center. Centralizing hardware and/or applications at the remote centralized network control center as provided herein may significantly mitigate costs associated with including such hardware and software within respective network control centers distributed throughout the grid (e.g., otherwise costly hardware and/or software may be duplicated, at least in part, across thousands of network control centers).

Accordingly, the remote centralized network control center may lease (e.g., rent) electrical network computational services to one or more network control centers (e.g., a third party may implement the remote centralized network control center for network control centers maintained by various power utility clients). The remote centralized network control center may comprise computational hardware configured to host a plurality of electrical network computational services that may be used to process substation data from various network control centers in parallel (e.g., the remote centralized network control center may comprise multi-core processors, multiple I/Os to respective network control centers, one or more hardware memory management units, and a hypervisor used to host one or more operating systems configured to run electrical network computational services in parallel). In one example, respective electrical network computational services may execute independently or isolated from one another (e.g. via implementation of a memory managed unit (MMU)). In this way, computational results may be provided to network control centers in real-time.

In one example, a request from a network control center to process substation data associated with one or more substations within a power grid may be received (e.g., at a remote centralized network control center). The network control center may be configured to manage the one or more substations, and may have collected the substation data (e.g., voltage data, frequency data, power data, current data, and/or a variety of other data that may be collected in real-time by the network control center). The remote centralized network control center may determine whether the network control center has established a lease specifying a level of service subscribed to by the network control center (e.g., the lease may comprise configuration data specifying particular computational requirements, hardware requirements, and/or electrical network distribution/transmission applications subscribed to by the network control center, etc.). Accordingly, provided that such a lease exits, the substation data may be processed by the remote centralized network control center using one or more electrical network computational services (e.g., a state estimator application, a contingency analysis application, a power flow analysis application, a security analysis application, an optimal power flow application, a stability analysis application, and/or other electrical network distribution/transmission applications) to create computational results. The computational results may be provided to the network control center (e.g., in real-time). In this way, the remote centralized network control center may provide electrical network computational services to a plurality of network control centers, which may mitigate hardware and/or software costs associated with such network control centers.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

A power grid may comprise a significant number of network control centers configured to manage substations within the power grid. A network control center may monitor substation data, process substation data, and/or provide control signals to substations, for example. It may be appreciated, the computational hardware and/or software used within the respective network control centers may be costly, and that such costs may be exacerbated where such hardware and software are redundant across many network control centers distributed throughout the power grid. Accordingly, as provided herein electrical network computational services may be leased to one or more network control centers from a remote centralized network control center. In this way, costs may be reduced across the network control centers because such network control centers may exclude at least some hardware and software that may instead be provided by the remote centralized network control center.

Figure 1:
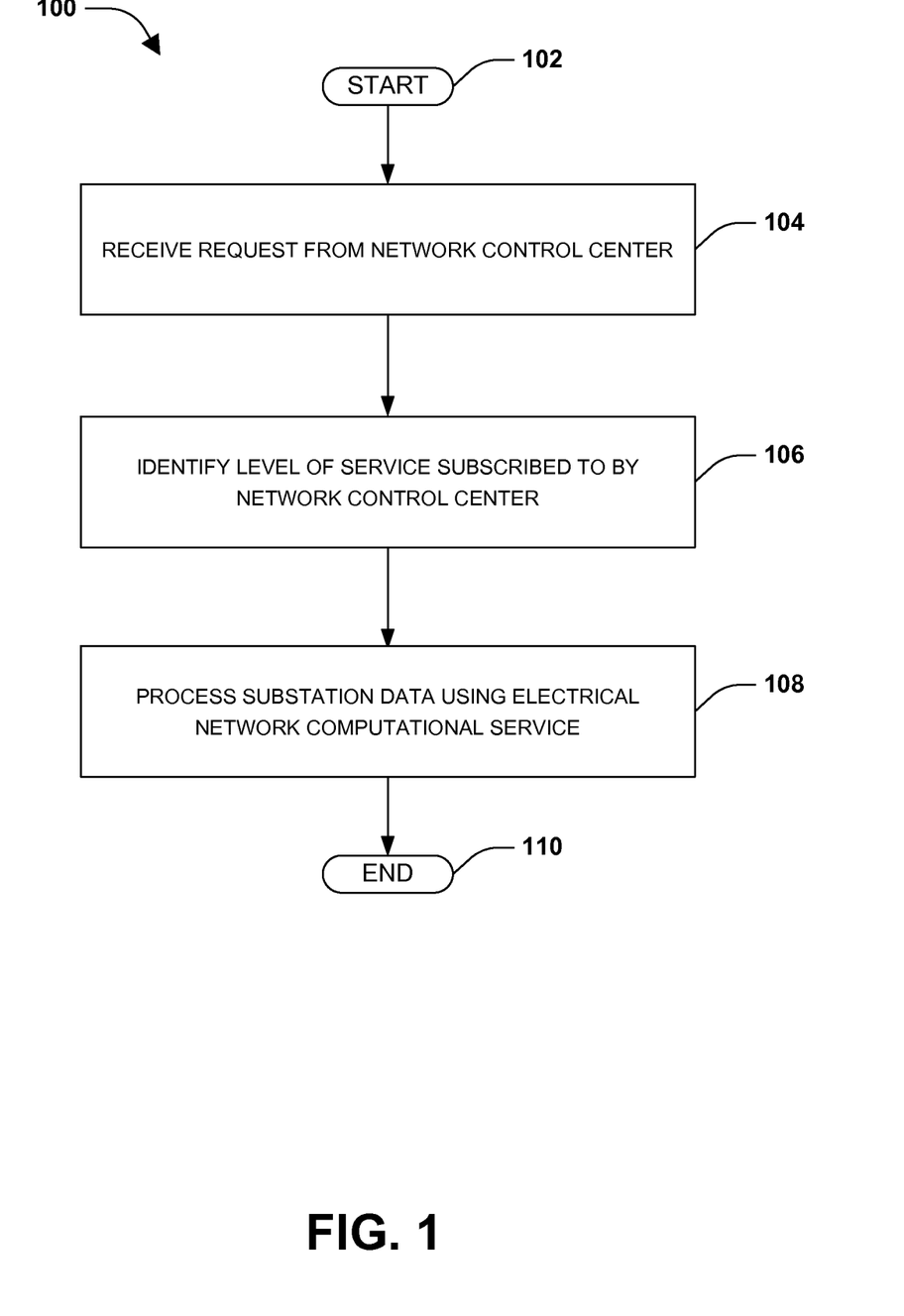
FIG. 1 is a flow diagram illustrating an exemplary method of leasing electrical network computational services to one or more network control centers.

One embodiment of leasing electrical network computational services to one or more network control centers is illustrated by an exemplary method 100 in FIG. 1. At 102, the method starts. At 104, a request may be received from a network control center to process substation data associated with one or more substations within a power grid (e.g., a remote centralized network control center may receive the request). The network control center may be configured to manage one or more substations. For example, the network control center may obtain substation data (e.g., current data, voltage data, power flow data, frequency data, etc.) from a substation and/or equipment associated with the substation, such as a generator. It may be appreciated that in one example, the network control center may lack at least some computational resources and/or electricity network applications used to process the substation data (e.g., which may mitigate costs associated with purchasing and/or maintaining the network control center). Accordingly, a lease for electrical network computational services may be provided to the network control center by the remote centralized network control center. The lease may specify a level of service subscribed to by the network control center (e.g., computational requirements, hardware requirements, and/or electrical network distribution/transmission applications subscribed to by the network control center).

In one example, the request may comprise a network control center ID identifying the network control center that made the request and/or a service identifier identifying an electrical network computational service requested for processing the substation data. At 106, a level of service subscribed to by the network control center may be identified. For example, the network control center ID may be used to identify a lease corresponding to the network control center. The lease may specify the level of service subscribed to by the network control center. For example, the network control center may subscribe to real-time data processing of substation data by one or more electrical network distribution applications and/or one or more electrical network transmission applications (e.g., a state estimator application and/or a contingency analysis application).

At 108, the substation data may be processed using the electrical network computational service, identified by the service identifier, according to the level of service to create computational results (e.g., the electrical computational service may comprise one or more electrical network distribution/transmission applications). In one example, the remote centralized network control center may invoke a hypervisor to identify and/or host an operating system comprising the electrical network computational service. In this way, computational results may be provided to the network control center (e.g., in real-time), which may display such results and/or issue control signals to one or more substations based upon the computational results. That is, the computational results obtained from the electrical network computational service may be sent back from the remote centralized network control center to the network control center that made the request. In order to facilitate secure transmission of information between the network control center and the centralized network control center, the request from the network control center and/or the computational results provided to the network control center may be encrypted, for example. In another example, a dedicated network may be used for secure communication between the network control center and the centralized network control center. In another example, SSH tunneling may be used for secure communication. It may be appreciated that various data communication security techniques are contemplated as falling within the scope of the appended claims.

It may be appreciated that in one example, the remote centralized network control center may be configured to service a vast number of network control centers. Accordingly, the remote centralized network control center may execute a plurality of electrical network computational services for one or more network control centers in parallel using computational hardware, such as one or more multi-core processors and/or one or more hardware memory management units. In one example of servicing multiple network control centers, a lease request may be received from a second network control center to establish a second lease. A second level of service may be assigned to the second network control center based upon the lease request. For example, the second level of service may specify that the second network control center has subscribed to real-time processing of substation data using a power flow analysis application. The second level of service may be specified within the second lease (e.g., the second lease may be assigned a second network control center ID identifying the second network control center and/or a second service identifier identifying the power flow analysis application).

In one example, a second request may be received from the second network control center to process second substation data associated with a second power grid. It may be appreciated that the second power grid may be the same or different as the power grid associated with the network control center. The second level of service subscribed to by the second network control center may be identified. The second substation data may be processed using a second electrical network computational service (e.g., the power flow analysis application) according to the second level of service (e.g., real-time processing) to create second computational results, which may be provided to the second network control center (e.g., where the second request and/or the second computational results may be encrypted). In this way, the remote centralized network control center may lease electrical network computational services to one or more network control centers (e.g., in parallel and/or in real-time). At 110, the method ends.

In one example of leasing electrical network computational services, a remote centralized network control center and one or more network control centers may be maintained (e.g., owned) by a single entity, such as a power utility company. Accordingly, a lease may comprise configuration data identifying the one or more network control centers that the remote centralized network control center is to service (e.g., the lease may identify one or more electrical network computational services that may be invoked by a network control center). In another example of leasing electrical network computational services, a remote centralized network control center and one or more network control centers may be maintained (e.g., owned) by separate entities. For example, a first company may maintain the remote centralized network control center, a second company may maintain a first set of network control centers, a third company may maintain a second set of network control centers, etc. In this way, the first company may lease electrical network computational services to one or more companies that maintain network control centers. Accordingly, a lease may specify a variety of information corresponding to a relationship between the remote centralized network control center (e.g., and/or a first entity that owns the remote network control center) and a network control center (e.g., and/or a second entity that owns the network control center). For example, the lease may specify payment terms for electrical network computational services (e.g., payment may be based upon resource utilization and/or cost savings achieved by using the remote centralized network control center, etc.), usage limits for electrical network computational services (e.g., defined by time, resource utilization, and/or payment terms, etc.), a lease duration (e.g., a time period for which the second entity has contracted with the first entity for leasing electrical network computational services), and/or a variety of other information. The lease may be updated based upon electrical network computational services performed by the remote centralized network control center (e.g., total usage data may be updated based upon the remote centralized network control center performing electrical network computational services for the network control center).

Figure 2:
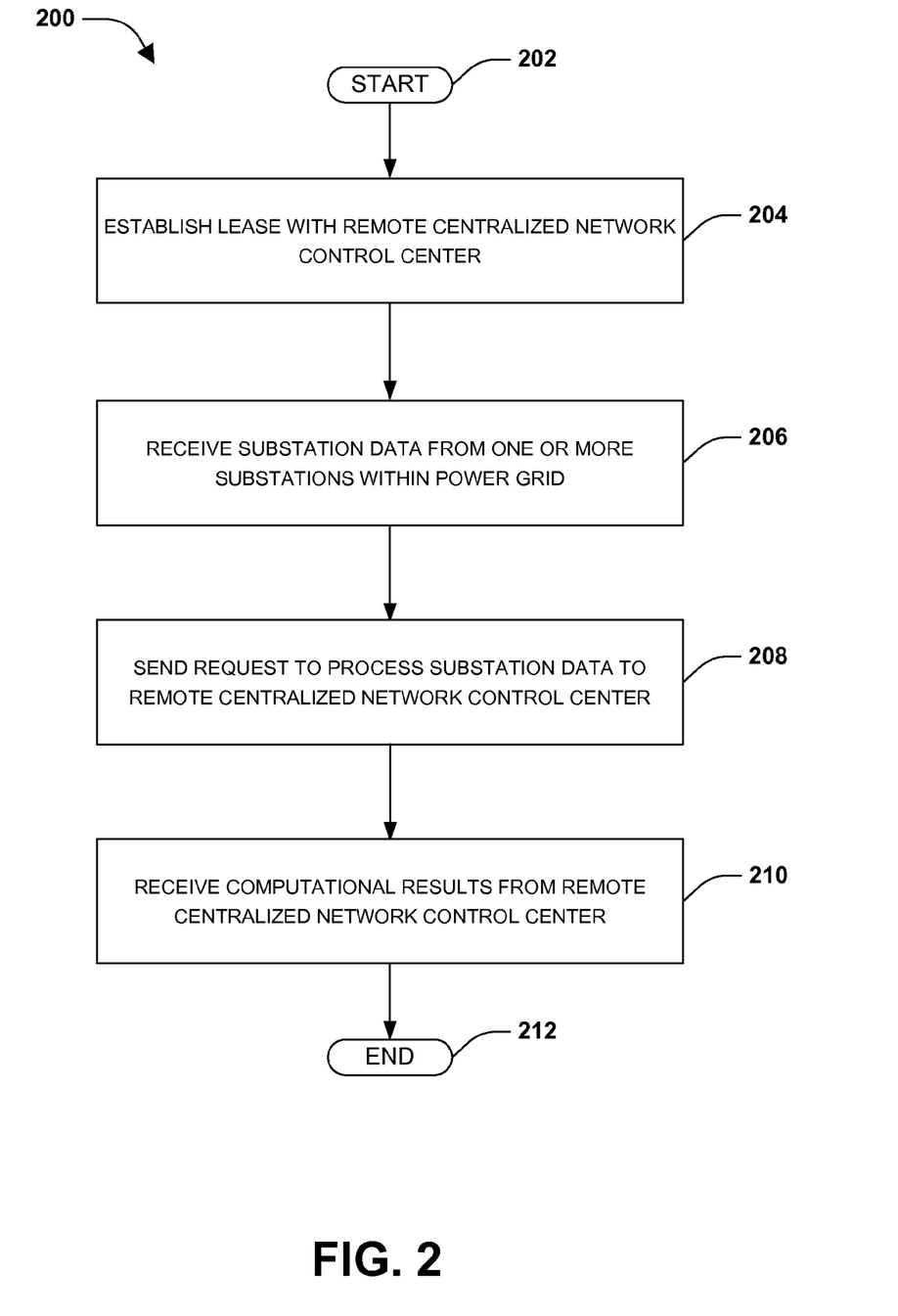
FIG. 2 is a flow diagram illustrating an exemplary method of obtaining a lease for electrical network computational services from a remote centralized network control center.

One embodiment of obtaining a lease for electrical network computational services from a remote centralized network control center is illustrated by an exemplary method 200 in FIG. 2. At 202, the method starts. At 204, a lease with a remote centralized network control center may be established by a network control center. The lease may specify a level of service that is to be provided by the remote centralized network control center to the network control center. For example, the lease may specify computational requirements (e.g., real-time processing of substation data), hardware requirements, and/or electrical network distribution/transmission applications (e.g., a state estimator application, a contingency analysis application, and/or a wide variety of other applications) subscribed to by the network control center.

At 206, the network control center may receive substation data from one or more substations within a power grid. It may be appreciated that in one example, a substation may comprise any equipment associated with the power grid (e.g., switching equipment, transformers, generators, transmission lines, distribution lines, protection equipment, control equipment, etc.). The substation data may comprise information collected from the one or more substations, such as current data, power data, voltage data, frequency data, etc. At 208, a request to process the substation data may be sent to the remote centralized network control center. For example, the request may comprise a network control center ID identifying the network control center and/or a service identifier identifying an electrical network computational service to be used for processing the substation data. In one example, the request may be encrypted, such that the remote centralized network control center may decrypt the request.

At 210, computational results may be received from the remote centralized network control center (e.g., in real-time). The computational results may correspond to an electrical network computational service that processed the substation data according to the level of service subscribed to by the network control center (e.g., as indicated by the lease). The network control center may display the computational results and/or provide control signals to a substation based upon the computational results. At 212, the method ends.

Figure 3:
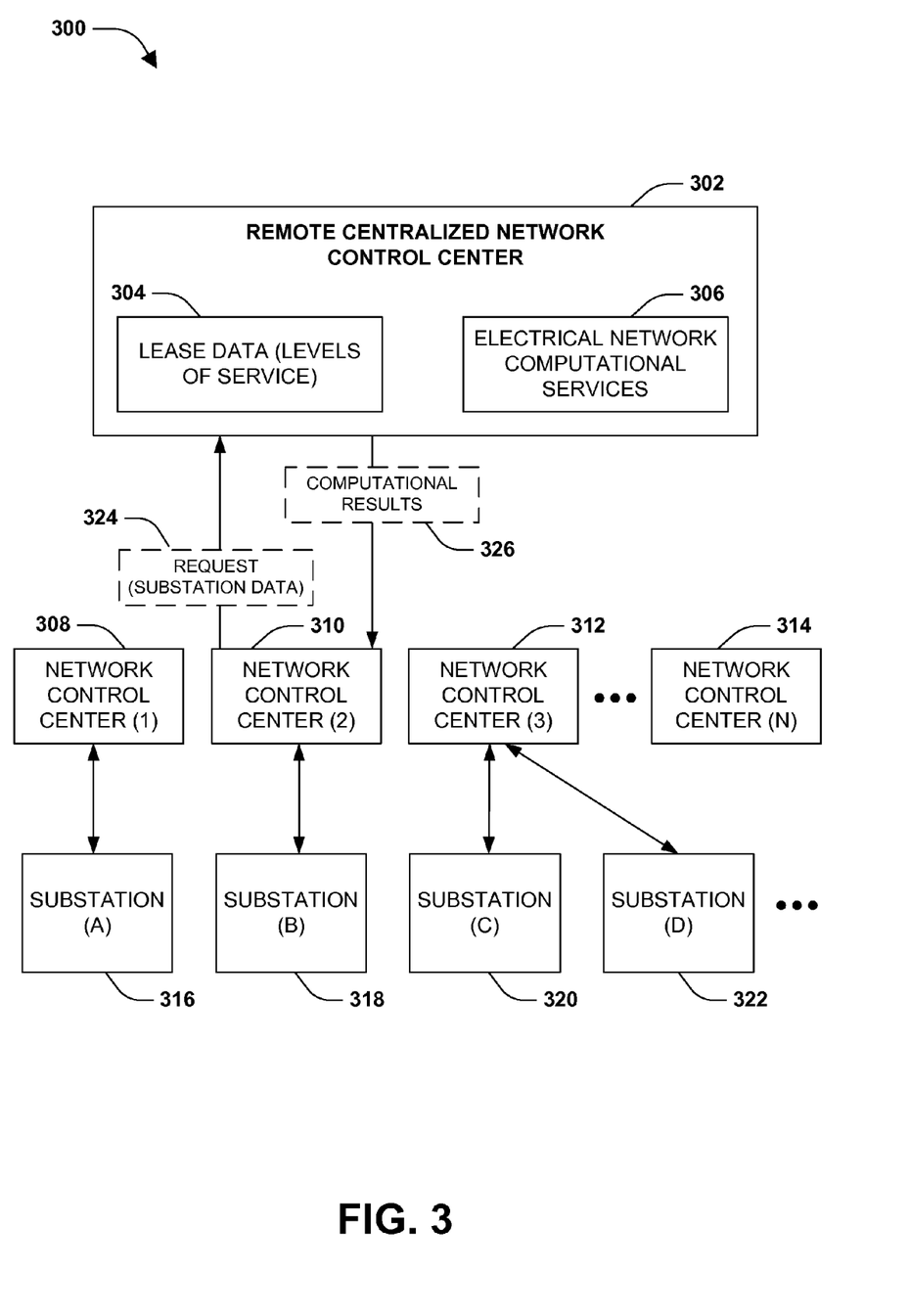
FIG. 3 is a component block diagram illustrating an exemplary system for leasing electrical network computational services to one or more network control centers.

FIG. 3 illustrates an example of a system 300 configured for leasing electrical network computational services 306 to one or more network control centers. The system 300 may comprise a remote centralized network control center 302. The remote centralized network control center 302 may be configured to provide electrical network computational services 306 to one or more network control centers associated with a power grid, such as network control center (1) 308, network control center (2) 310, network control center (3) 312, network control center (N) 314, and/or other network control centers not illustrated. For example, the network control center (2) 310 may establish a lease within the remote centralized network control center 302 for real-time processing of substation data using a state estimator application and/or a power flow analysis application. In this way, the remote centralized network control center 302 may store lease data 304 specifying levels of service for respective network control centers.

Respective network control centers may be configured to manage one or more substations. For example, network control center (1) 308 may manage substation (A) 316, network control center (2) 310 may manage substation (B) 318, network control center (3) 312 may manage substation (C) 320 and/or substation (D) 322, etc. It may be appreciated that in one example, a substation may comprise any equipment associated with the power grid (e.g., switching equipment, transformers, generators, transmission lines, distribution lines, protection equipment, control equipment, etc.). A network control center may be configured to obtain substation data from one or more substations. For example, network control center (2) 310 may obtain substation data from substation (B) 318.

Because a network control center may lack at least some computational hardware and/or software used to process substation data (e.g., to mitigate costs associated with purchasing and/or maintaining the network control center), the network control center may send a request to the remote centralized network control center 302 for processing at least some of the substation data. For example, the remote centralized network control center 302 may receive a request 324 from the network control center (2) 310 to process at least some of the substation data associated with the substation (B) 318. The request 324 may comprise the substation data, a network control center ID identifying the network control center (2) 310, and/or a service identifier identifying an electrical network computational service for processing the substation data. The remote centralized network control center 302 may identify a level of service subscribed to by the network control center (2) 310 based upon the lease data 304 (e.g., the network control center ID may be used to identify the lease for the network control center (2) 310). The remote centralized network control center 302 may process the substation data using an electrical network computational service according to the level of service to create computational results 326 (e.g., the service identifier may be used to identify the electrical network computational service within the electrical network computational services 306 for processing the substation data). In this way, the remote centralized network control center 302 may provide the computational results 326 to the network control center (2) 310 (e.g., where at least some of the request 324 and/or results 326 may be encrypted and/or otherwise protected).

Figure 4:
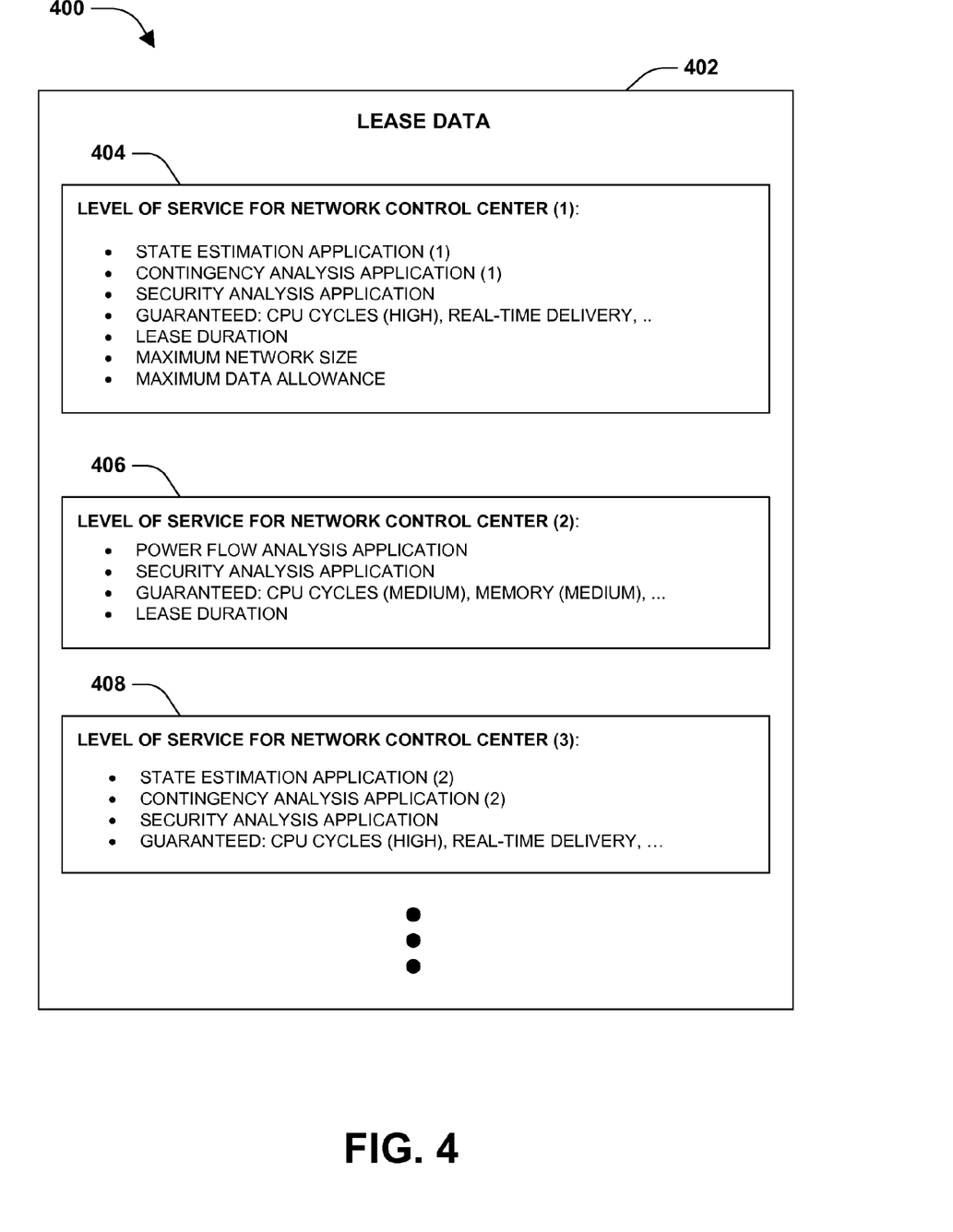
FIG. 4 is an illustration of an example of lease data.

FIG. 4 illustrates an example 400 of lease data 402. The lease data 402 may be maintained by a remote centralized network control center configured to lease out electrical network computational services to one or more network control centers. The lease data 402 may comprise one or more leases, such as a first lease 404 for a network control center (1), a second lease 406 for a network control center (2), a third lease 408 for a network control center (3), and/or other leases not illustrated.

A lease may specify a level of service subscribed to by a network control center. For example, the first lease 404 may specify a first level of service for the network control center (1), which may indicate that the network control center (1) has subscribed to a state estimation application (1), a contingency analysis application (1), a security analysis application, a particular set of computational requirements (e.g., a relatively high number of CPU cycles, real-time processing of substation data, real-time delivery of computational results, etc.), and/or other lease terms (e.g., a lease duration, a maximum network bandwidth allowance, a maximum data allowance, etc.). The second lease 406 may specify a second level of service for the network control center (2), which may indicate that the network control center (2) has subscribed to a power flow analysis application, a security analysis application, a particular set of computational requirements (e.g., a relatively medium number of CPU cycles, a relatively medium amount of memory storage and/or backup, etc.), and/or other lease terms (e.g., a lease duration, etc.). The third lease 408 may specify a third level of service for the network control center (3), which may indicate that the network control center (3) has subscribed to a state estimation application (2) (e.g., a different version of the state estimation application (1) subscribed to by the network control center (1)), a contingency analysis application (2), a security analysis application, and/or a particular set of computational requirements (e.g., a relatively high number of CPU cycles, real-time delivery of computational results, etc.). In this way, the remote centralized network control center may lease electrical network computational services to network control centers based upon the lease data 402.

Figure 5:
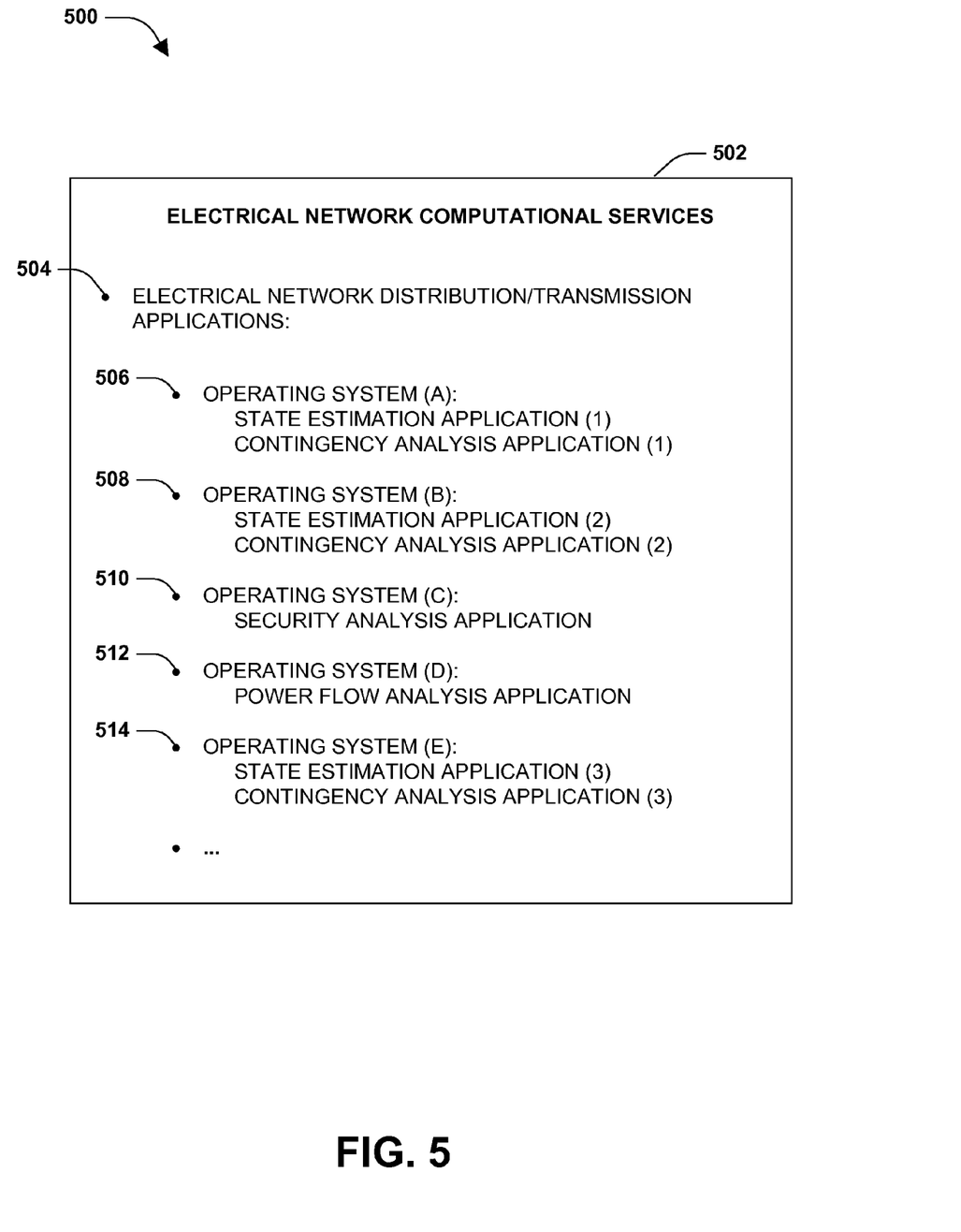
FIG. 5 is an illustration of an example of electrical network computational services hosted by a remote centralized network control center.

FIG. 5 illustrates an example 500 of electrical network computational services 502 hosted by a remote centralized network control center. The electrical network computational services 502 may comprise electrical network distribution/transmission applications 504, which may be subscribed to by network control centers within lease data (e.g., a lease for a network control center may specify a level of service identifying electrical network distribution/transmission applications subscribed to by the network control center). The remote centralized network control center may host the electrical network distribution/transmission applications 504 within one or more operating systems. By way of example, a hypervisor may manage the one or more operating systems for the remote centralized network control center.

In one example of the electrical network computational services 502, an operating system (A) 506 may comprise a state estimation application (1) and/or a contingency analysis application (1), an operating system (B) 508 may comprise a state estimation application (2) and/or a contingency analysis application (2), an operating system (C) 510 may comprise a security analysis application, an operating system (D) 512 may comprise a power flow analysis application, an operating system (E) 514 may comprise a state estimation application (3) and/or a contingency analysis application (3), etc. Upon receiving a request to process substation data from a network control center, the hypervisor may be configured to select an appropriate operating system for processing the substation data. In one example, the selected operating system may comprise an electrical network distribution/transmission application subscribed to by the network control center, which may match a service identifier within the request. In another example, the selected operating system may be selected based upon computational requirements subscribed to by the network control center (e.g., an operating system capable of providing real-time processing of the substation data may be selected). In this way, the remote centralized network control center may provide electrical network computational services 502 to one or more network control centers.

Figure 6:
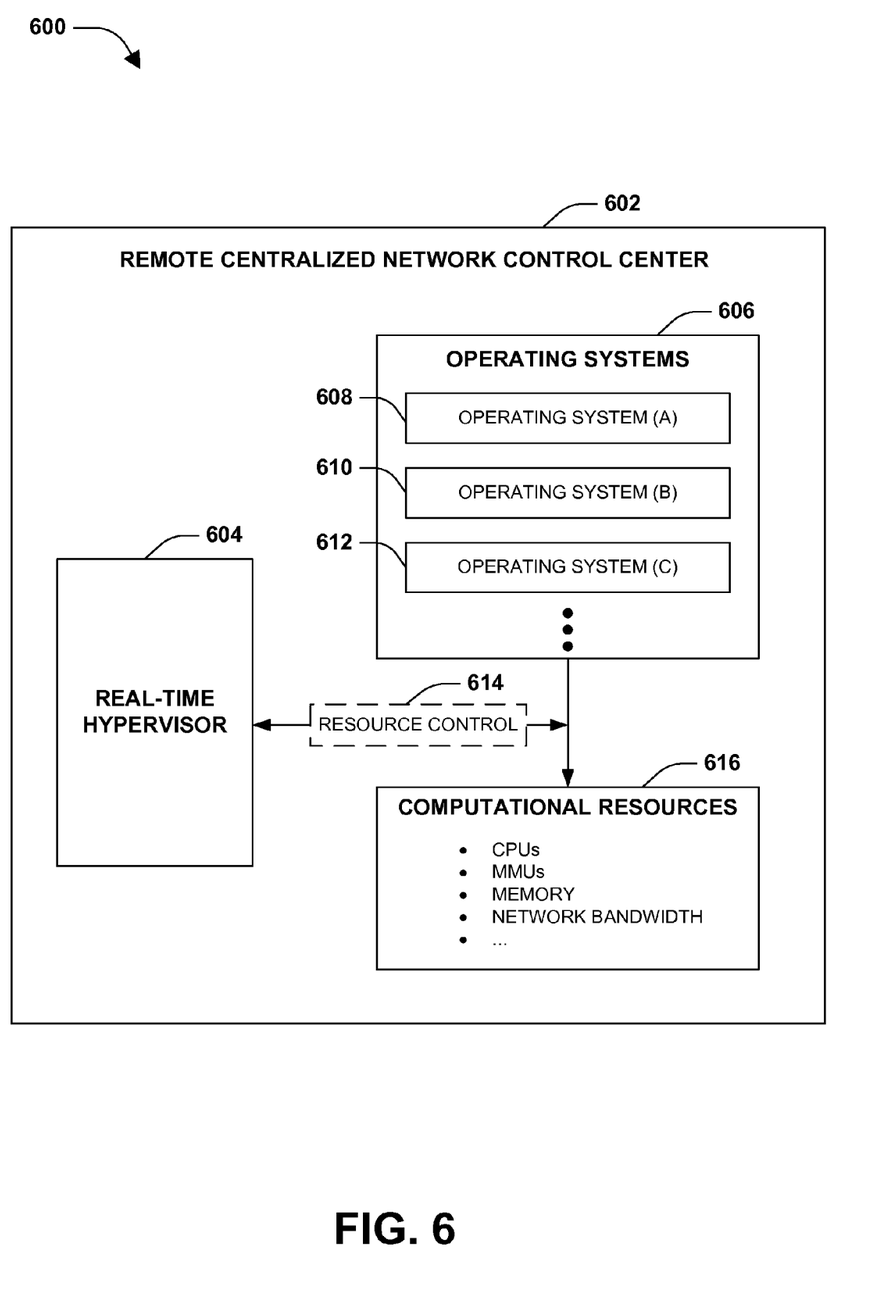
FIG. 6 is an illustration of an example of a remote centralized network control center.

FIG. 6 illustrates an example 600 of a remote centralized network control center 602. The remote centralized network control center 602 may be configured to lease electrical network computational services to one or more network control centers (e.g., a network control center configured to manage one or more substations within a power grid). In one example, the remote centralized network control center 602 may host electrical network computational services within operating systems 606. For example, operating system (A) 608 may be configured to host a first set of electrical network distribution/transmission applications, operating system (B) 610 may be configured to host a second set of electrical network distribution/transmission applications, operating system (C) 612 may be configured to host a third set of electrical network distribution/transmission applications, etc. (e.g., where there may or may not be overlap of applications between any one or more of the operating system). In this way, the remote centralized network control center 602 may execute electrical network computational services hosted within the operating systems 606 on behalf of one or more network control centers.

The remote centralized network control center 602 may comprise a real-time hypervisor 604. The real-time hypervisor 604 may be configured to manage one or more of the operating systems 606. In one example, upon the remote centralized network control center 602 receiving a request to process substation data from a network control center, the real-time hypervisor 604 may identify and/or assign an operating system to process the substation data. In another example, the real-time hypervisor 604 may be configured to perform resource control 614 between the operating systems 606 and computational resources 616 of the remote centralized network control center 602. For example, the real-time hypervisor 604 may provide an operating system with a particular level of access to the computational resources 616 so that the substation data may be processed according to computational requirements specified in a lease for the network control center (e.g., real-time processing of substation data). In this way, the remote centralized network control center 602 may lease electrical network computational services to network control centers.

Figure 7:
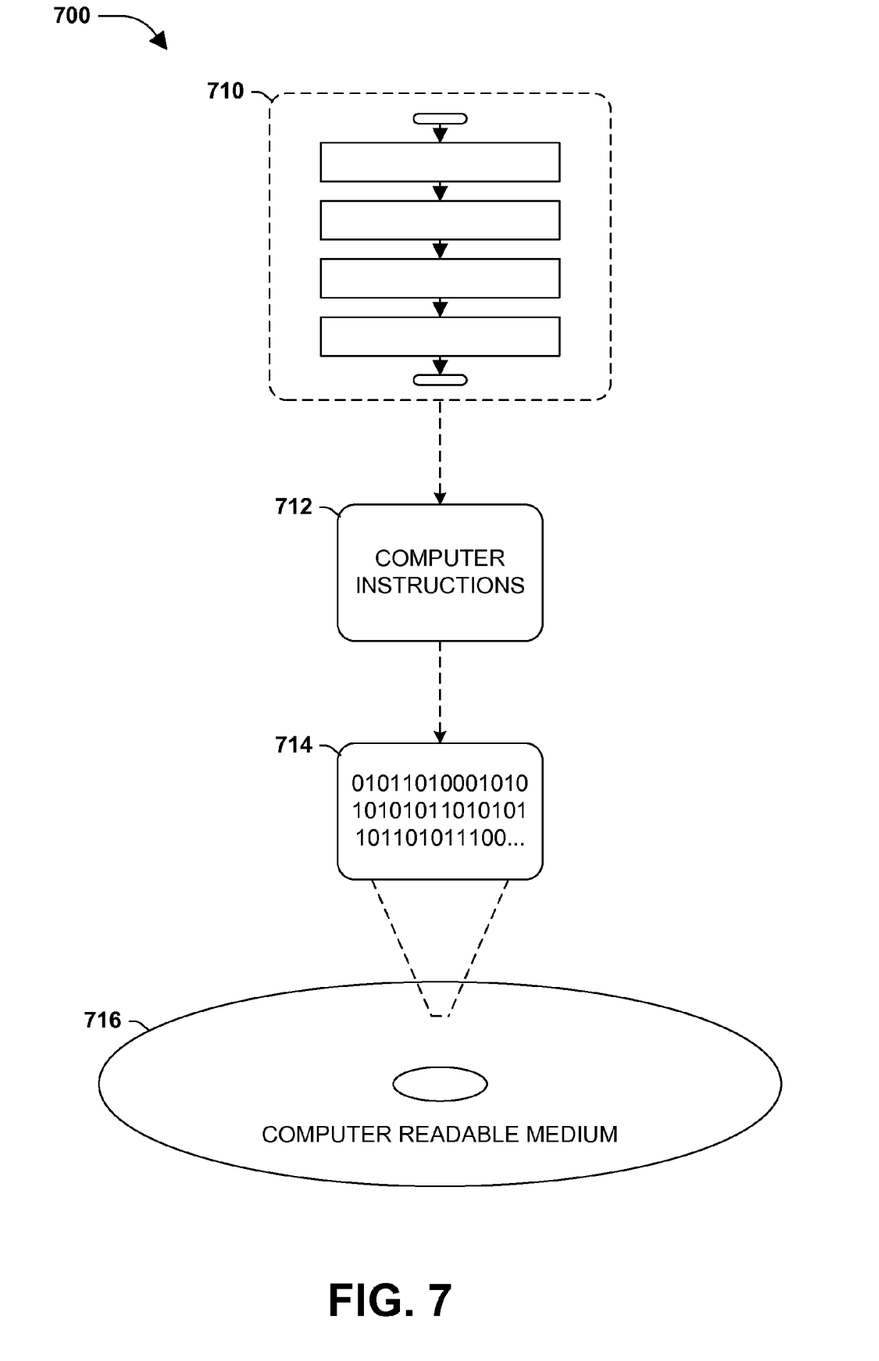
FIG. 7 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 716 (e.g., a CD-R, DVD-R, or a platter of a hard disk drive), on which is encoded computer-readable data 714. This computer-readable data 714 in turn comprises a set of computer instructions 712 configured to operate according to one or more of the principles set forth herein. In one such embodiment 700, the processor-executable computer instructions 712 may be configured to perform a method 710, such as at least some of the exemplary method 100 of FIG. 1 and/or at least some of the exemplary method 200, for example. In another such embodiment, the processor-executable instructions 712 may be configured to implement a system, such as at least some of the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
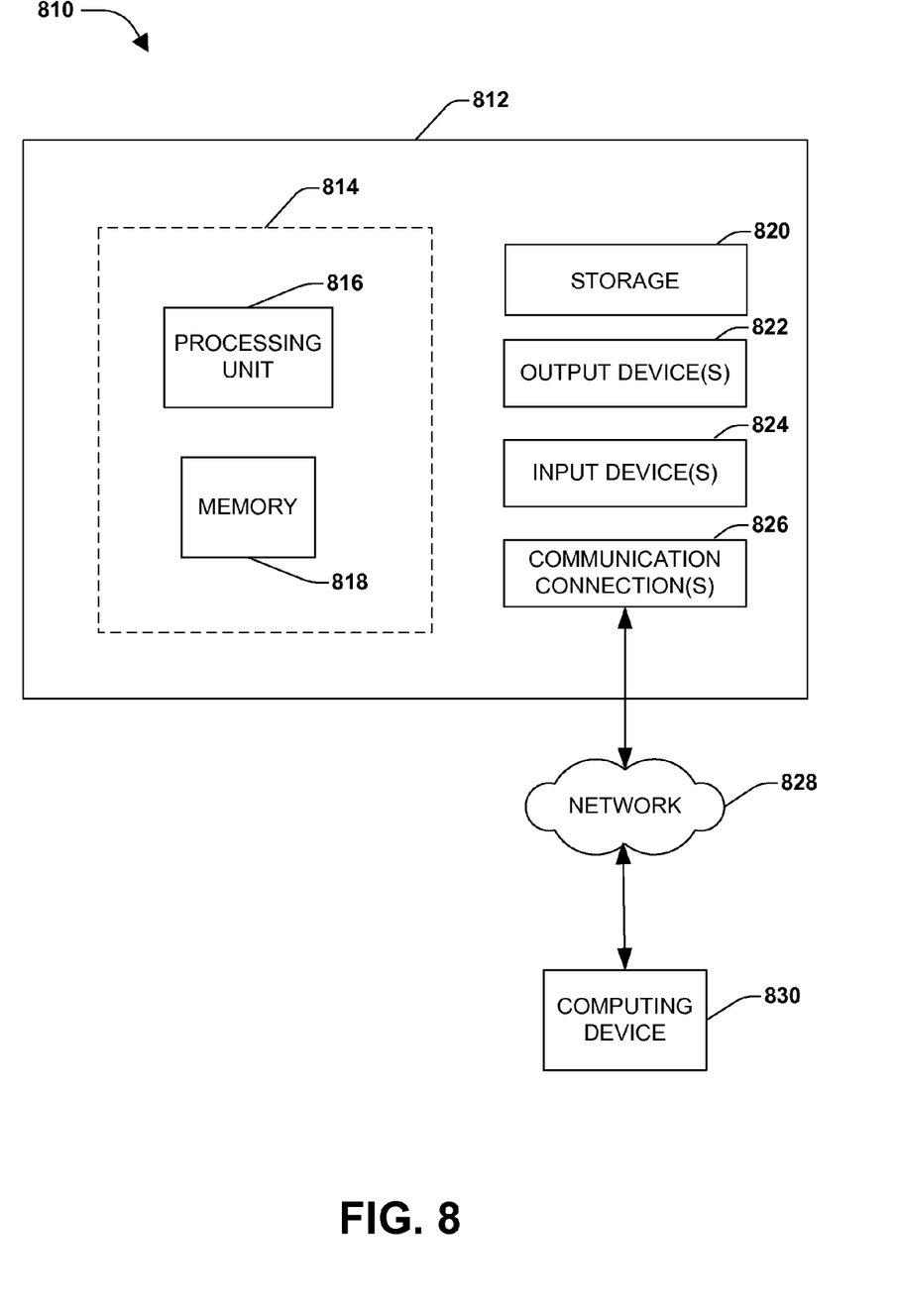
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for leasing electrical network computational services from a remote centralized network control center to one or more network control centers, comprising:

receiving, by a remote centralized network control center, a request from a network control center to process substation data associated with one or more substations within a power grid;
identifying a level of service subscribed to by the network control center based upon a lease between the remote centralized network control center and the network control center, the level of service specifying at least one of an electrical network application, a hardware performance criteria, a software performance criteria, a lease duration, or a frequency of electrical network application execution subscribed to by the network control center;
processing, by the remote centralized network control center on behalf of the network control center, the substation data using an electrical network computational service according to the level of service to create computational results, the processing comprising identifying and assigning an operating system to process the substation data by a real-time hypervisor of the remote centralized network control center to execute the electrical network computational service;
providing the computational results from the remote centralized network control center to the network control center, in real-time, in response to the request; and
instructing the network control center to at least one of display the computational results or utilize the computational results to make real-time control signals for the one or more substations.

2. The method of claim 1, the request comprising a service identifier identifying the electrical network computational service.

3. The method of claim 1, the electrical network computational service comprising an electricity network transmission application.

4. The method of claim 1, the request comprising a network control center ID identifying the network control center.

5. The method of claim 1, the electrical network computational service comprising an electrical network distribution application.

6. The method of claim 1, the electrical network computational service comprising a steady state analysis application.

7. The method of claim 1, comprising:
executing a plurality of electrical network computational services for one or more network control centers in parallel.

8. The method of claim 1, the electrical network computational service comprising a transient analysis application.

9. The method of claim 7, comprising:
facilitating independent execution of respective electrical network computational services.

10. The method of claim 1, comprising:
receiving a lease request from a second network control center to establish a second lease; and
assigning a second level of service to the second network control center based upon the lease request.

11. The method of claim 1, comprising:
receiving a second request from a second network control center to process second substation data associated with a second power grid;
identifying a second level of service subscribed to by the second network control center;
processing the second substation data using a second electrical network computational service according to the second level of service to create second computational results; and
providing the second computational results from the remote centralized network control center to the second network control center in response to the second request.

12. A method for obtaining a lease for electrical network computational services from a remote centralized network control center, comprising:
establishing, by a network control center, a lease with a remote centralized network control center specifying a level of service provided by the remote centralized network control center for the network control center, the level of service specifying at least one of an electrical network application, a hardware performance criteria, a software performance criteria, a lease duration, or a frequency of electrical network application execution subscribed to by the network control center;
receiving substation data from one or more substations within a power grid;
sending a request to the remote centralized network control center to process the substation data utilizing an operating system that invokes a real-time hypervisor of the remote centralized network control center to execute an electrical network computational service according to the level of service;
receiving computational results, in real-time, from the remote centralized network control center in response to the request, the computational results corresponding to the air electrical network computational service processing the substation data according to the level of service, the electrical network computational service executed by the remote centralized network control center on behalf of the network control center; and
utilizing the computational results for at least one of display or to make real-time control signals for the one or more substations.

13. The method of claim 12, the electrical network computational service comprising an electricity network transmission application.

14. The method of claim 12, the sending a request comprising:
sending a service identifier identifying the electrical network computational service.

15. The method of claim 12, the sending a request comprising:
sending a network control center ID identifying the network control center.

16. A system for leasing electrical network computational services to one or more network control centers, comprising:
a remote centralized network control center configured to:
receive a request from a network control center to process substation data associated with one or more substations within a power grid;
identify a level of service subscribed to by the network control center based upon a lease between the remote centralized network control center and the network control center, the level of service specifying at least one of an electrical network application, a hardware performance criteria, a software performance criteria, a lease duration, or a frequency of electrical network application execution subscribed to by the network control center;
process the substation data, on behalf of the network control center, using an electrical network computational service according to the level of service to create computational results, comprising identifying and assigning an operating system to process the substation data by a real-time hypervisor of the remote centralized network control center to execute the electrical network computational service;

provide the computational results from the remote centralized network control center to the network control center, in real-time, in response to the request; and instruct the network control center to at least one of display the computational results or utilize the computational results to make real-time control signals for the one or more substations.

17. The system of claim 16, the request comprising a service identifier identifying the electrical network computational service.

18. The system of claim 16, the request comprising a network control center ID identifying the network control center.

19. The system of claim 16, the remote centralized network control center comprising a hardware memory management unit (MMU).

20. The system of claim 16, the remote centralized network control center configured to host a plurality of electrical network computational services for one or more network control centers in parallel.

* * * * *